(12) United States Patent
Robinson et al.

(10) Patent No.: US 11,790,395 B2
(45) Date of Patent: Oct. 17, 2023

(54) METHODS AND SYSTEMS FOR ALLOCATING RESOURCES IN RESPONSE TO SOCIAL MEDIA CONVERSATIONS

(71) Applicant: Kimberly-Clark Worldwide, Inc., Neenah, WI (US)

(72) Inventors: Timothy Robinson, Neenah, WI (US); Robert A Loos, Neenah, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 686 days.

(21) Appl. No.: 16/492,455

(22) PCT Filed: Apr. 4, 2018

(86) PCT No.: PCT/US2018/026051
§ 371 (c)(1),
(2) Date: Sep. 9, 2019

(87) PCT Pub. No.: WO2018/187448
PCT Pub. Date: Oct. 11, 2018

(65) Prior Publication Data
US 2021/0150564 A1     May 20, 2021

Related U.S. Application Data

(60) Provisional application No. 62/483,011, filed on Apr. 7, 2017.

(51) Int. Cl.
*G06Q 30/0242* (2023.01)
*G06Q 10/0631* (2023.01)
*G06Q 50/00* (2012.01)

(52) U.S. Cl.
CPC ... *G06Q 30/0244* (2013.01); *G06Q 10/06312* (2013.01); *G06Q 50/01* (2013.01)

(58) Field of Classification Search
None
See application file for complete search history.

(56) References Cited

U.S. PATENT DOCUMENTS

| 8,375,024 B2 | 2/2013 | Goeldi |
| 9,288,123 B1 | 3/2016 | Safford et al. |

(Continued)

FOREIGN PATENT DOCUMENTS

| WO | 2016085409 A1 | 6/2016 |
| WO | 2017027718 A1 | 2/2017 |

OTHER PUBLICATIONS

International Preliminary Report on Patentability, dated Sep. 23, 2019, for related International application No. PCT/2018/026051 (6 pgs.).

(Continued)

*Primary Examiner* — Stephanie Z Delich
(74) *Attorney, Agent, or Firm* — Armstrong Teasdale LLP

(57) ABSTRACT

A social media impact analysis (SMIA) computer device and methods for allocating resources in response to social media conversations are provided. The SMIA device stores for a plurality of escalation levels, corresponding trigger criteria and resource allocations, where each trigger criteria includes a sales impact range and a content category. The SMIA device is configured to receive tracking signals relating to social media conversations about a product over a time period, each tracking signal including a topic of social media conversation and correlated to a predicted future sales impact; detect that a tracking signal deviates from a threshold; compare the tracking signal to the trigger criteria for the escalation levels; and allocate resources automatically in response to the social media conversations according to the resource allocation for a first of the escalation levels.

18 Claims, 8 Drawing Sheets

(56) References Cited

U.S. PATENT DOCUMENTS

| | | | | |
|---|---|---|---|---|
| 9,547,832 | B2* | 1/2017 | Gordon | G06Q 30/02 |
| 9,652,306 | B1* | 5/2017 | Wagner | G06F 9/45533 |
| 10,003,560 | B1* | 6/2018 | Perkins | H04L 51/16 |
| 10,546,326 | B2* | 1/2020 | Publicover | H04N 21/4532 |
| 2011/0125550 | A1* | 5/2011 | Erhart | H04W 4/21 |
| | | | | 705/7.29 |
| 2011/0282860 | A1 | 11/2011 | Baarman et al. | |
| 2011/0320423 | A1 | 12/2011 | Gemmell et al. | |
| 2013/0024389 | A1 | 1/2013 | Gupta | |
| 2013/0073336 | A1 | 3/2013 | Heath | |
| 2013/0124653 | A1 | 5/2013 | Vick et al. | |
| 2014/0095231 | A1 | 4/2014 | Cherusseri et al. | |
| 2014/0143013 | A1 | 5/2014 | Pavlidis et al. | |
| 2014/0143405 | A1* | 5/2014 | Pavlidis | G06Q 30/0201 |
| | | | | 709/224 |
| 2015/0012336 | A1 | 1/2015 | Leach et al. | |
| 2015/0025977 | A1 | 1/2015 | Doyle et al. | |
| 2015/0032675 | A1* | 1/2015 | Huehn | G06Q 50/01 |
| | | | | 707/740 |
| 2015/0066985 | A1 | 3/2015 | Antony et al. | |
| 2015/0088593 | A1 | 3/2015 | Raghunathan et al. | |
| 2015/0149373 | A1 | 5/2015 | Chhaya et al. | |
| 2015/0178745 | A1 | 6/2015 | Soria et al. | |
| 2015/0181039 | A1* | 6/2015 | Erhart | H04M 3/5191 |
| | | | | 379/265.09 |
| 2015/0302315 | A1 | 10/2015 | Ahn et al. | |
| 2016/0335649 | A1 | 11/2016 | Ghosh et al. | |
| 2018/0293607 | A1* | 10/2018 | Huddleston | G06Q 50/01 |

OTHER PUBLICATIONS

International Search Report for International Application No. PCT/US2018/026051, dated Jul. 25, 2018, 3 pages.

Written Opinion of the International Search Authority for International Application No. PCT/US2018/026051, dated Jul. 25, 2018, 8 pages.

Moorman, C. Measuring The Impact Of Social Media On Your Business. https://www.forbes.com/sites/christinemoorman/2015/01/18/measuring-the-impact-of-social-media-on-your-business/#c8daf2615e5d. Published Jan. 18, 2015, accessed Sep. 5, 2019.

Nguyen, T. H., Shirai, K. 2015. Topic Modeling based Sentiment Analysis on Social Media for Stock Market Prediction. Proceedings of the 53rd Annual Meeting of the Association for Computational Linguistics and the 7th International Joint Conference on Natural Language Processing, pp. 1354-1364, Beijing, China, Jul. 26-31.

* cited by examiner

METHODS AND SYSTEMS FOR ALLOCATING RESOURCES IN RESPONSE TO SOCIAL MEDIA CONVERSATIONS

CROSS REFERENCE TO RELATED APPLICATION

This application is a U.S. National Phase Application of PCT/US2018/026051, filed Apr. 4, 2018, which claims the benefit of priority to U.S. Provisional Patent Application Serial No. 62/483,011, filed Apr. 7, 2017 and entitled METHODS AND SYSTEMS FOR ALLOCATING RESOURCES IN RESPONSE TO SOCIAL MEDIA CONVERSATIONS, the contents of which are hereby expressly incorporated by reference in their entirety.

BACKGROUND

The field of the invention relates generally to analyzing social media, and more specifically, to allocating resources in response to social media conversations.

Social media sources including, for example, news sites, blogs, bulletin boards, messaging applications and websites, product review websites, etc., may serve as proxies for customers' opinions of brands and/or companies. Such opinions commonly include past customer experiences and current expectations about products and/or services. For instance, subjective personal opinions as well as more objective professional reviews about products and/or services that spread or proliferate via social media may often affect buying behavior and future sales.

Currently used tools for social media tracking and analysis provide an isolated measurement approach that quantifies an effect of paid and social media advertisement exposure; however, there is no further insight into the type of brand conversations that drive incremental sales. Additionally, the impact that social media conversations about a product or brand have on short-term sales is typically unknown for 1-2 weeks until the sales are actually affected. Thus, in the event of a negative social media conversation regarding a product, for example, it is difficult to determine a type and quantity of response measures that may be effective to counter an expected negative sales effect. Moreover, although general pre-scripted responses to negative or positive comments or reviews about a product have been used, the type, pre-scripted content, and quantity of response measures for each identified social media conversation are selected at a responder's discretion with no consistent approach to handle the persistence and potential sales impact of each social media conversation. As a result, overall deployment of response resources may be inefficient and/or ineffective in countering a negative social media conversation or capitalizing on a positive social media conversation.

BRIEF DESCRIPTION

A social media impact analysis (SMIA) computer device is provided. The SMIA device stores for a plurality of escalation levels, corresponding trigger criteria and resource allocations, where each trigger criteria includes a sales impact range and a content category. The SMIA device is configured to receive tracking signals relating to social media conversations about a product over a time period, each tracking signal including a topic of social media conversation and correlated to a predicted future sales impact; detect that a tracking signal deviates from a threshold, wherein the threshold is generated from historical values of the tracking signal; compare the tracking signal to the trigger criteria for the escalation levels; and allocate resources automatically in response to the social media conversations according to the resource allocation for a first of the escalation levels in response to determining that (i) the at least one topic of social media conversation of the one of the tracking signals is within the content category of the first escalation level, and (ii) the predicted future sales impact of the one of the tracking signals is within the sales impact range of the first escalation level.

In another aspect, a method for allocating social media resources in response to the social media conversations is provided. The method is implemented using a SMIA computer device that includes a processor in communication with a memory. The memory stores, for each of a plurality of escalation levels, a corresponding trigger criteria and a corresponding resource allocation, each of the corresponding trigger criteria including a sales impact range and a content category. The method includes receiving, by the SMIA computing device, a plurality of tracking signals relating to social media conversations about a product over a time period. Each tracking signal of the plurality of tracking signals includes at least one topic of social media conversation and is correlated to a predicted future sales impact on the product. The method also includes detecting, by the SMIA computing device, that one of the tracking signals deviates from a threshold tracking signal, wherein the threshold tracking signal is generated from weighted historical values of the one of the tracking signals. The method also includes comparing, by the SMIA computing device in response to the detection, the one of the tracking signals to the trigger criteria for the plurality of escalation levels. The method further includes allocating resources, by the SMIA computing device, automatically in response to the social media conversations according to the resource allocation for one of the escalation levels in response to determining at least one of (i) that the at least one topic of social media conversation of the one of the tracking signals is within the content category of the one of the escalation levels, and (ii) that the predicted future sales impact of the one of the tracking signals is within the sales impact range of the one of the escalation levels.

In yet another aspect, at least one non-transitory computer-readable storage media having computer-executable instructions embodied thereon is provided. The instructions are executed by at least one processor in communication with at least one memory device, the at least one memory device storing, for each of a plurality of escalation levels, a corresponding trigger criteria and a corresponding resource allocation, each of the corresponding trigger criteria including a sales impact range and a content category. The computer-executable instructions cause the processor to receive a plurality of tracking signals relating to social media conversations about a product over a time period, each tracking signal of the plurality of tracking signals including at least one topic of social media conversation and correlated to a predicted future sales impact on the product, detect that one of the tracking signals deviates from a threshold tracking signal, wherein the threshold tracking signal is generated from weighted historical values of the one of the tracking signals, compare, in response to the detection, the one of the tracking signals to the trigger criteria for the plurality of escalation levels, and allocate resources automatically in response to the social media conversations according to the resource allocation for a first of the escalation levels in response to determining that (i) the at least one topic of social media conversation of the one of the tracking signals is within the content category of the first escalation level, and (ii) the predicted future sales impact of the one of the tracking signals is within the sales impact range of the first escalation level.

BRIEF DESCRIPTION OF THE DRAWINGS

FIG. 1 is a simplified block diagram of an example social media impact analysis system used for allocating social media resources in response to the social media conversations.

FIG. 2 illustrates an example configuration of a client system shown in FIG. 1, in accordance with one embodiment of the present disclosure.

FIG. 3 illustrates an example configuration of a server system shown in FIG. 1, in accordance with one embodiment of the present disclosure.

FIG. 4 is a flow chart of a process for allocating resources in response to the social media conversations using the system shown in FIG. 1.

FIG. 5 is a diagram of components of one or more example computing devices that may be used in the system shown in FIG. 1.

FIG. 6 is a diagram of a social media conversation tracking signal that may be used by the system shown in FIG. 1.

FIG. 7 is a flow chart of a process for allocating resources in response to the social media conversations using the system shown in FIG. 1.

FIG. 8 is a diagram of components of one or more example computing devices that may be used in the system shown in FIG. 1.

Figure 1:
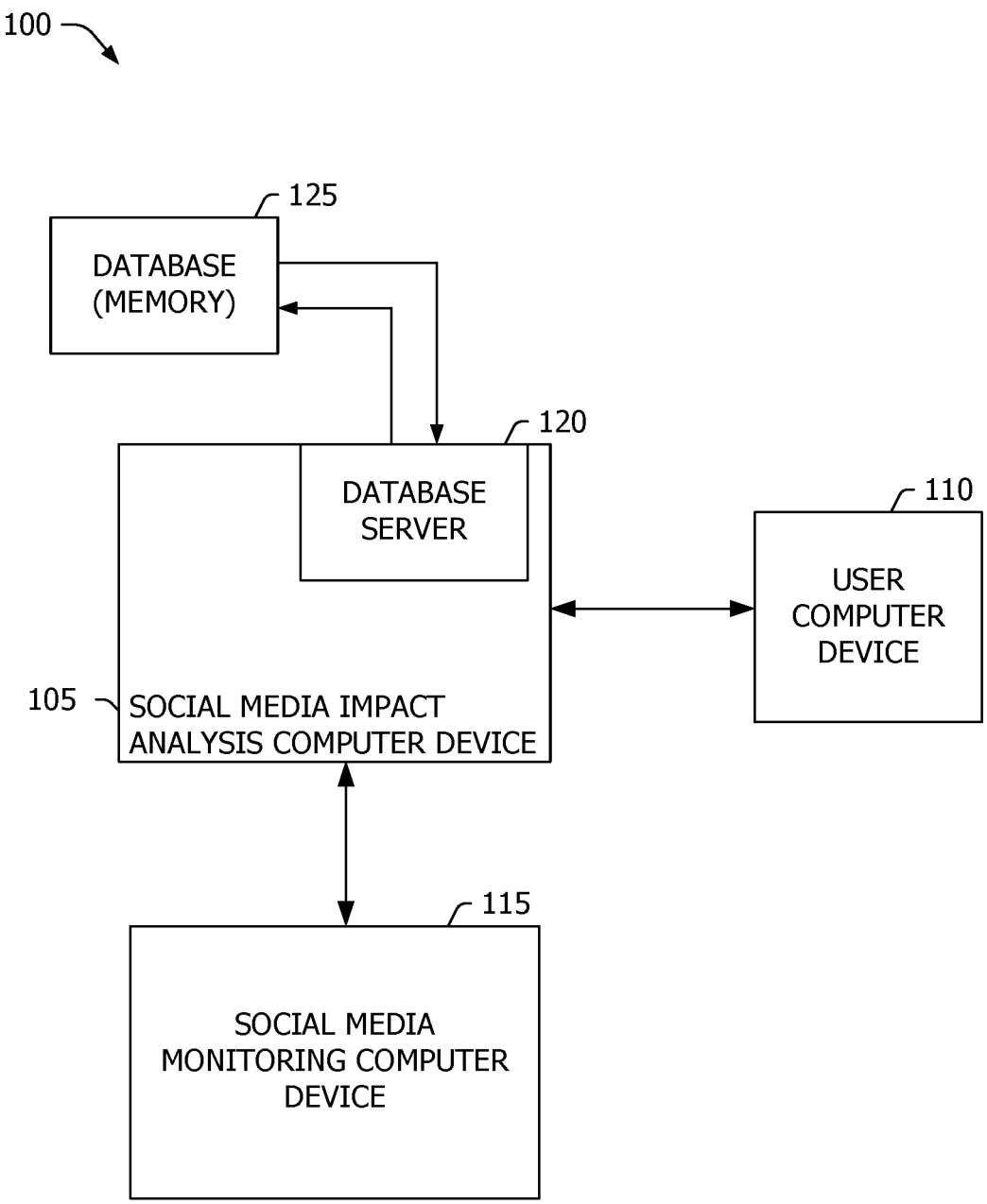
FIGS. 1-8 show example embodiments of the methods and systems described herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

The implementations described herein relate to analyzing social media, and more specifically, to allocating resources in response to the social media conversations. More specifically, a social media impact analysis (SMIA) computer device (also known as a SMIA server) receives and monitors a plurality of social media conversation activity tracking signals relating to a product over a time period, the plurality of social media conversation activity tracking signals including topics of social media conversations correlated to future sales volume of the product. The SMIA computer device generates an average conversation activity tracking signal for the product by averaging the plurality of received social media conversation activity tracking signals over the time period. The SMIA computer device compares a current social media conversation activity tracking signal to the average conversation activity tracking signal and allocates resources, such as but not limited to social media responses, traditional media responses (e.g., print advertisements or television commercials), or other promotional (or marketing activities) in response to the social media conversations. Moreover, the SMIA computer device also efficiently enables an entity to determine a potential sales impact based on social media conversations, allocate resources to attempt to mitigate the potential sales impact before it is actually realized, and continuously monitor the effectiveness of the resources after allocation and before sales impact realization.

Described herein are computer systems such as the SMIA computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

At least one of the technical problems addressed by this system may include: (i) improving speed and efficiency of determining a potential sales impact caused by social media conversations; (ii) efficiently enabling an entity to allocate resources to offset the potential sales impact before realizing an actual sales impact; (iii) determining feedback regarding effectiveness of the allocated resources before realizing an actual sales impact; and (iv) maintaining a positive brand image among social media users and their respective conversations.

The methods and systems described herein may be implemented using computer programming or engineering techniques including computer software, firmware, hardware, or any combination or subset thereof, wherein the technical effects may be achieved by performing at least one of the following steps: (a) receive and monitor a plurality of social media conversation tracking signals relating to a product over a time period, the plurality of social media conversation tracking signals including topics of social media conversations correlated to sales volume of the product; (b) generate a threshold tracking signal by averaging the plurality of received social media conversation tracking signals over the time period; (c) compare a current social media conversation tracking signal to the threshold tracking signal; and (d) allocate resources in response to the social media conversations.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified block diagram of an example social media impact analysis system 100 used for allocating resources in response to the social media conversations. As described below in more detail, a social media impact analysis ("SMIA") computer device 105 is configured to receive and monitor a plurality of social media conversation tracking signals relating to a product over a time period, the plurality of social media conversation tracking signals including topics of social media conversations correlated to sales volume of the product. Although the SMIA computer device 105 is described herein as monitoring social media conversations with regard to a product, it should be understood that the term "product" as used in this context may refer to a single product, a brand name or other suite of related products, a business division or business entity, a spokesperson associated with any of the above, or any other sales-related item, unless the context indicates that the term "product" refers to a specific product. SMIA computer device 105 is also configured to generate a threshold tracking signal by averaging the plurality of received social media conversation tracking signals over the time period. The SMIA computer device 105 is further configured to compare a current social media conversation tracking signal to the threshold tracking signal. Moreover, the SMIA computer device 105 is configured to allocate resources in response to the social media conversations.

In the example embodiment, the user computer devices 110 are computers that include a web browser or a software application to enable the user computer devices 110 to access the SMIA computer device 105 using the Internet or a network. More specifically, the user computer devices 110 are communicatively coupled to the SMIA computer device 105 through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 110 can be any device capable of accessing the Internet, or another network, including, but not limited to, a desktop computer, a laptop computer, a personal digital assistant (PDA), a cellular phone, a smartphone, a tablet, a phablet, or other web-based connectable equipment. In the example embodiment, a user uses a user computer device 110 to receive predicted sales impacts and/or alerts from SMIA computer device 105 and to take action to influence the social media conversations.

The SMIA computer device 105 includes one or more computer devices configured to perform as described herein. In the example embodiment, the SMIA computer device 105 includes one or more server systems configured to communicate with the user computer device 110 and a social media monitoring ("SMM") computer device 115. In some embodiments, the SMIA computer device 105 is remote from at least one of the user computer device 110, the SMM computer device 115, and the database server 120, and communicates with the remote computer device through the Internet. More specifically, the SMIA computer device 105 is communicatively coupled to Internet through many interfaces including, but not limited to, at least one of a network, such as a local area network (LAN), a wide area network (WAN), or an integrated services digital network (ISDN), a dial-up-connection, a digital subscriber line (DSL), a cellular phone connection, and a cable modem. SMIA computer device 105 can be any device capable of accessing the Internet, or another network, including, but not limited to, a desktop computer, a laptop computer, a personal digital assistant (PDA), a cellular phone, a smartphone, a tablet, a phablet, or other web-based connectable equipment.

A database server 120 is communicatively coupled to a database 125 that stores data. In one embodiment, the database 125 includes conversation topics, threshold data, sales data for the target entity, and/or historical social media trends associated with the target entity. In the example embodiment, the database 125 is stored remotely from the SMIA computer device 105. In some embodiments, the database 125 is decentralized. In the example embodiment, a person can access database 125 via user computer devices 110 by logging onto SMIA computer device 105, as described herein.

The SMM computer device 115 is configured to monitor social media conversations from any of a plurality of different social media sources (e.g., news sites, blogs, bulletin boards, messaging applications and websites, product review websites, etc.) and provide a plurality of social media conversation tracking signals relating to the product over a time period to the SMIA computer device 105. In the example embodiment, the SMIA computer device 105 is in communication with the SMM computer device 115. More specifically, the SMIA computer device 105 is communicatively coupled to the SMM computer device 115 through many interfaces including, but not limited to, at least one of the Internet, a network, such as a local area network (LAN), a wide area network (WAN), or an integrated services digital network (ISDN), a dial-up-connection, a digital subscriber line (DSL), a cellular phone connection, and a cable modem. The SMM computer device 115 may be associated with a target entity controlling the SMIA computer device 105 or may be associated with a third party.

Figure 2:
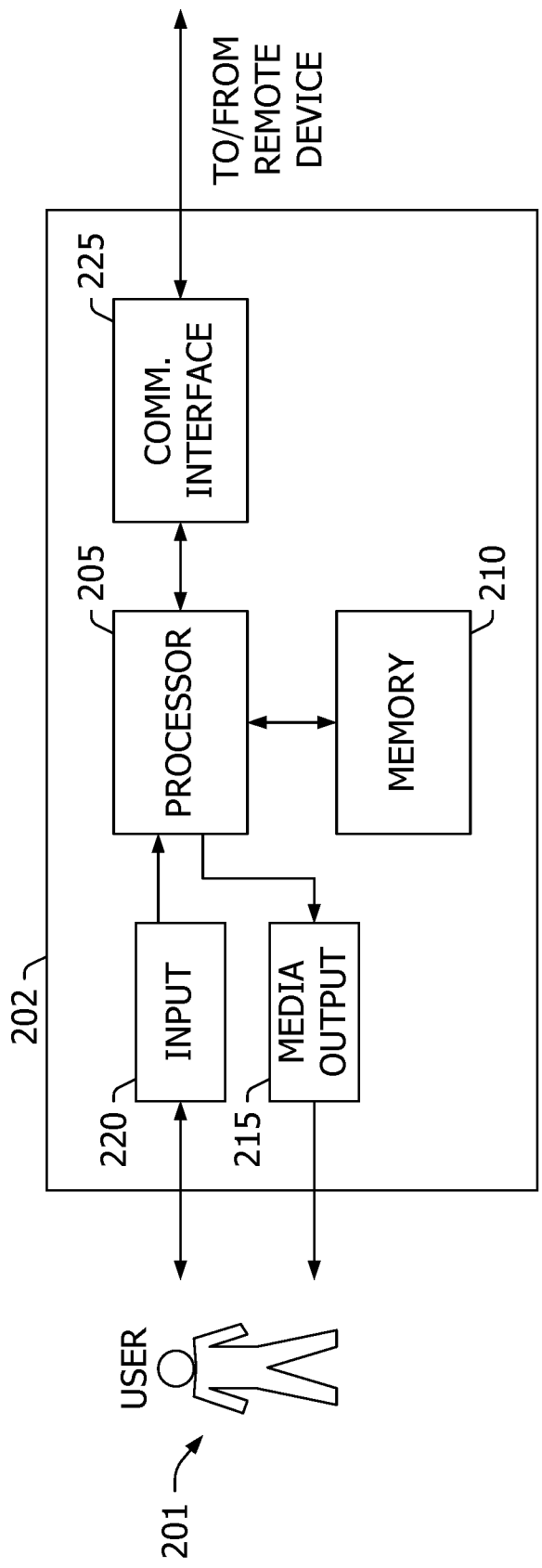

FIG. 2 illustrates an example configuration of a client system, shown in FIG. 1, in accordance with one embodiment of the present disclosure. The user computer device 202 is operated by a user 201. The user computer device 202 may include, but is not limited to, the user computer device 110 (shown in FIG. 1). The user computer device 202 includes a processor 205 for executing instructions. In some embodiments, executable instructions are stored in a memory area 210. The processor 205 may include one or more processing units (e.g., in a multi-core configuration). The memory area 210 is any device allowing information such as executable instructions and/or transaction data to be stored and retrieved. The memory area 210 may include one or more computer-readable media.

The user computer device 202 also includes at least one media output component 215 for presenting information to user 201. The media output component 215 is any component capable of conveying information to the user 201. In some embodiments, the media output component 215 includes an output adapter (not shown) such as a video adapter and/or an audio adapter. An output adapter is operatively coupled to the processor 205 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, the media output component 215 is configured to present a graphical user interface (e.g., a web browser and/or a client application) to the user 201. A graphical user interface may include, for example, analysis of one or more hyperspectral images. In some embodiments, the user computer device 202 includes an input device 220 for receiving input from the user 201. The user 201 may use the input device 220 to, without limitation, select and/or enter one or more mission parameters or device parameters. The input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of the media output component 215 and the input device 220.

The user computer device 202 may also include a communication interface 225, communicatively coupled to a remote device such as the SMIA computer device 105 (shown in FIG. 1). The communication interface 225 may include, for example, a wired or wireless network adapter and/or a wireless data transceiver for use with a mobile telecommunications network.

Stored in the memory area 210 are, for example, computer-readable instructions for providing a user interface to the user 201 via the media output component 215 and, optionally, receiving and processing input from the input device 220. The user interface may include, among other possibilities, a web browser and/or a client application. Web browsers enable users, such as the user 201, to display and interact with media and other information typically embedded on a web page or a website from the SMIA computer device 105. A client application allows the user 201 to interact with, for example, the SMIA computer device 105. For example, instructions may be stored by a cloud service and the output of the execution of the instructions sent to the media output component 215.

Figure 3:
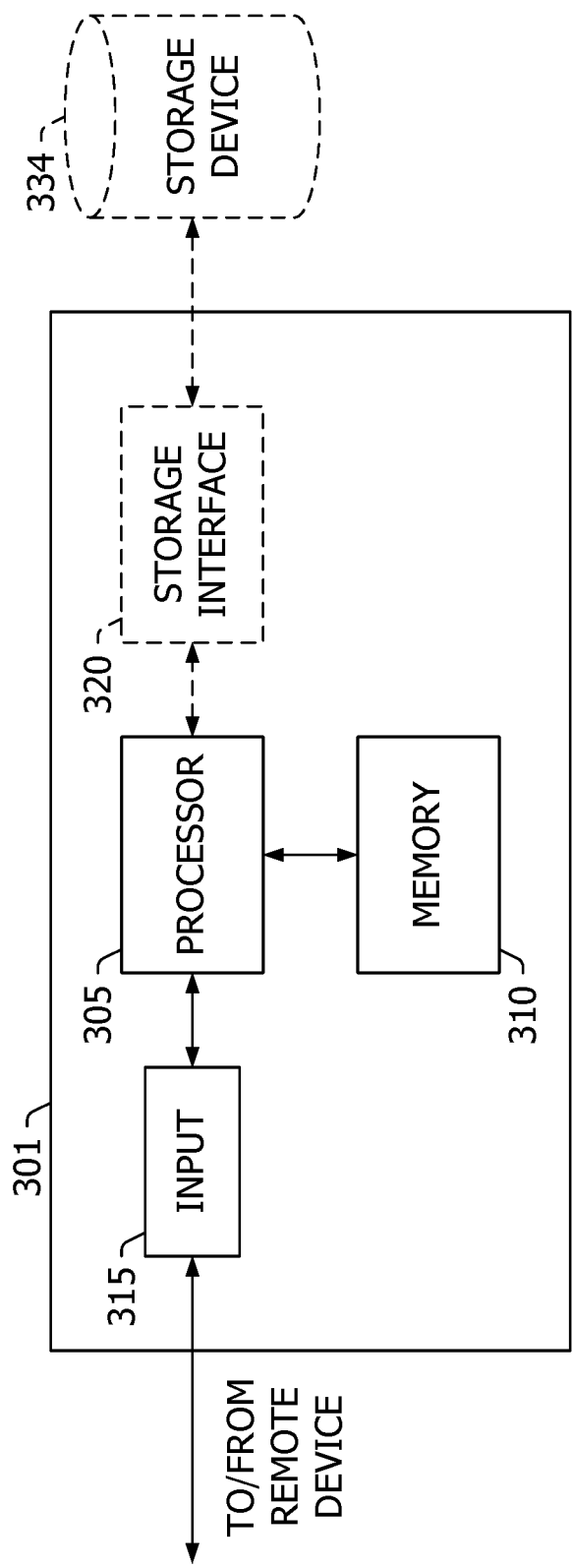

FIG. 3 illustrates an example configuration of a server system, shown in FIG. 1, in accordance with one embodiment of the present disclosure. The server computer device 301 may include, but is not limited to, the database server 120 and the SMIA computer device 105 (both shown in FIG. 1). The server computer device 301 also includes a processor 305 for executing instructions. Instructions may be stored in a memory area 310. The processor 305 may include one or more processing units (e.g., in a multi-core configuration).

The processor 305 is operatively coupled to a communication interface 315 such that the server computer device 301 is capable of communicating with a remote device such as another server computer device 301, the user computer device 110, the SMM computer device 115, or the SMIA computer device 105 (shown in FIG. 1). For example, the communication interface 315 may receive requests from the user computer devices 110 via the Internet.

The processor 305 may also be operatively coupled to a storage device 334. The storage device 334 is any computer-operated hardware suitable for storing and/or retrieving data, such as, but not limited to, data associated with the database 125 (shown in FIG. 1). In some embodiments, the storage device 334 is integrated in the server computer device 301. For example, the server computer device 301 may include one or more hard disk drives as the storage device 334. In other embodiments, the storage device 334 is external to the server computer device 301 and may be accessed by a plurality of server computer devices 301. For example, the storage device 334 may include a storage area network (SAN), a network attached storage (NAS) system, and/or multiple storage units such as hard disks and/or solid state disks in a redundant array of inexpensive disks (RAID) configuration.

In some embodiments, the processor 305 is operatively coupled to the storage device 334 via a storage interface 320. The storage interface 320 is any component capable of providing the processor 305 with access to the storage device 334. The storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 305 with access to the storage device 334.

The processor 305 executes computer-executable instructions for implementing aspects of the disclosure. In some embodiments, the processor 305 is transformed into a special purpose microprocessor by executing computer-executable instructions or by otherwise being programmed. For example, the processor 305 is programmed with the instructions such as are illustrated in FIG. 4.

Figure 4:
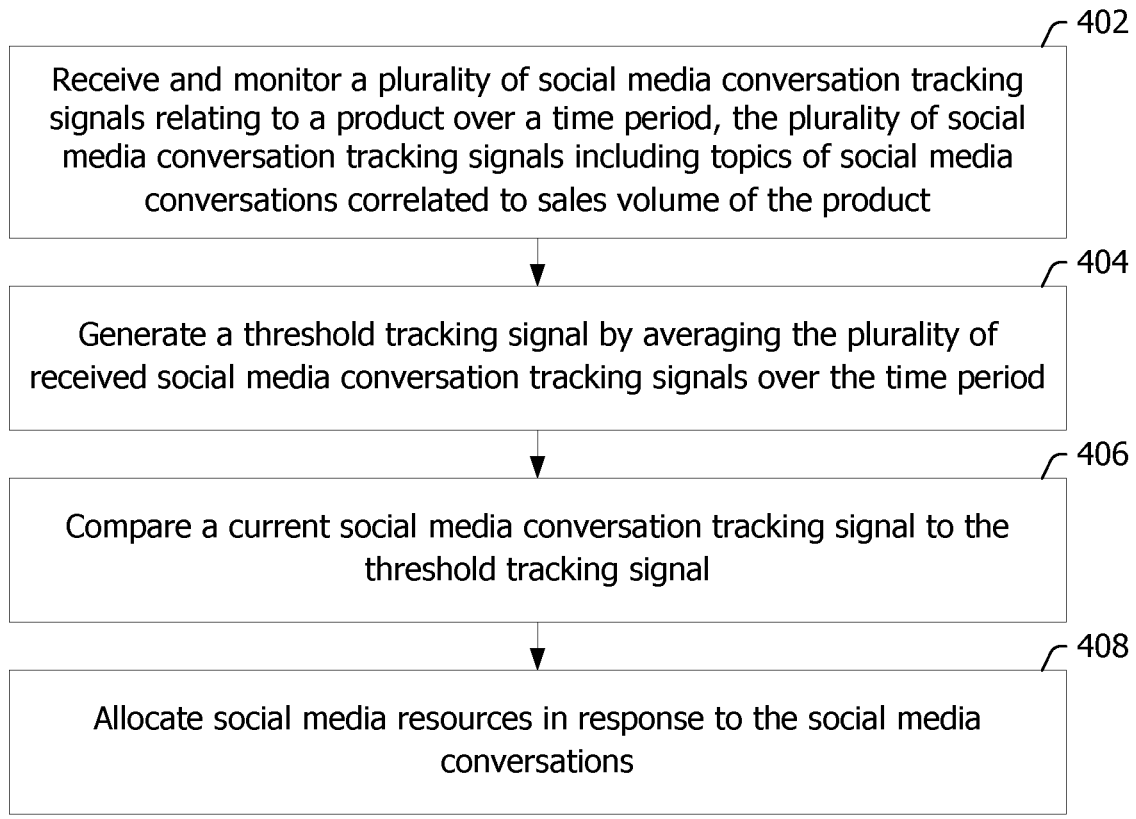

FIG. 4 is a flow chart of a process 400 for allocating resources in response to the social media conversations using the social media impact analysis system 100 (shown in FIG. 1). In the example embodiment, the process 400 is performed by the SMIA computer device 105 (shown in FIG. 1).

In the exemplary embodiment, the SMIA computer device 105 receives and monitors 402 a plurality of social media conversation activity tracking signals relating to a product over a time period, wherein the conversation activity tracking signals include topics of conversation activity as they correlate to sales volume of the product. In the exemplary embodiment, the conversation activity tracking signals are received from the SMM computer device 115 (shown in FIG. 1) and may include any information provided by a social media user that is associated with the target entity providing the product. As noted above, the term "product" as used in this context may refer to a single product, a brand name or other suite of related products, a business division or business entity, a spokesperson associated with any of the above, or any other sales-related item, unless the context indicates that the term "product" refers to a specific product. For example, conversation activity may include, but is not limited to, check-ins, page posts, status updates, etc. The conversation activity may further include, for example, one or more tags identifying the target entity associated with the brand owner, or an object related to the social media conversations may be identified through text-parsing the content of the conversations or through any other suitable technique.

In the exemplary embodiment, the SMIA computer device 105 generates 404 an average conversation activity signal by averaging the plurality of received conversation activity tracking signals over the time period. The average conversation activity signal indicates an average amount of conversation activity for a topic over a recent time period, such as the most recent one day, one week, or two weeks. Because the topics directly correlate to sales volume, the average amount of conversation activity also indicates an average amount of sales relating to the topic.

In the example embodiment, the SMIA computer device 105 compares 406 a current conversation activity tracking signal to the average conversation activity signal. More specifically, the current conversation activity tracking signal is a signal received from the SMM computer device 115 over a time period, such as one day. The current conversation activity tracking signal indicates an amount of conversation activity for the topic over the one day. Comparing the current conversation activity tracking signal to the average conversation activity signal includes determining whether the current conversation activity tracking signal deviates from the average conversation activity signal by a predetermined deviation threshold. A positive or negative deviation from the threshold tracking signal indicates an increase or decrease in conversations including the topic. Depending on the particular topic, the increase or decrease in conversations may correlate to a positive or a negative sales impact on the product. For example, if the topic relates negatively to the product, such as "unsafe" or "recall", an increase in conversations about these topics will correlate to a negative sales impact over the next few weeks. Alternatively, if the topic relates positively to the product, such as "rewards" or "high quality", an increase in conversations about these topics will correlate to a positive sales impact over the next few weeks.

The SMIA computer device 105 allocates 408 resources in response to the social media conversations. More specifically, if the deviation of the current conversation activity tracking signal relative to the average conversation activity signal exceeds the predetermined deviation threshold, the SMIA computer device 105 calls for an allocation of resources to influence the social media conversations. Allocating resources includes, for example, taking action to offset or remedy a negative topic of conversation, and as a result, cause the negative deviation of the current social media conversation tracking signal relative to the threshold tracking signal to decrease. By influencing the social media conversations as soon as possible after determining increased conversation activity of a topic, the impact on sales of the product over the next one or two weeks may be mitigated before any actual sales impact is realized, or at least much faster than if the entity were to wait for a sales impact to be realized before attempting to influence the social media conversations. As another example, allocating resources may include pro-actively increasing distribution of the product to retailers to meet a predicted increase in sales demand correlated with a positive topic of conversation.

In some embodiments, allocating resources in response to a negative conversation may include pro-actively placing messages into the social media environment to attempt to influence the social media conversations by sending apologies, discounts, promotions, and/or advertisements informing users of improvements or changes made to the product to address any issues. Additionally or alternatively, allocating resources in response to a negative conversation may include use of traditional media or promotional activities, such as print ads, radio or television commercials, in-store displays and flyers, and other suitable measures. In other embodiments, allocating resources may include, for topics relating to positive sales impact, providing rewards, promotions, and/or messages, requesting positive feedback, and/or presenting advertisements notifying users of new promotions, products, or services that leverage the positive conversation.

In some embodiments, the SMIA computer device 105 continuously monitors current conversation activity tracking signals each day for a number of days to determine to what extent the allocation of resources is affecting the social media conversations as desired. More specifically, the SMIA computer device 105 continuously determines whether the deviations of the current conversation activity tracking signals from the average conversation activity signal are trending in a positive direction over the next number of days. When the deviation falls back below the predetermined deviation threshold, the social media conversations are no longer projected to have a significant sales impact, indicating that resources allocated for the specific topic of social media conversation will no longer have an impact. Accordingly, the SMIA computer device 105 determines, addresses, and resolves a potential sales impact on a product based on social media conversations before any sales impact is actually realized.

In some embodiments, the SMIA computer device 105 allocates resources directly, for example by automatically generating pre-selected social media messages or automatically updating product distribution orders. In other embodiments, the SMIA computer device 105 allocates resources indirectly, for example by alerting an operator that resources should be allocated to or away from a particular conversation.

In some embodiments, the SMIA computer device 105 receives the plurality of conversation activity tracking signals from the SMM computer device 115. The SMM computer device 115 is configured to monitor social media conversations from any of a plurality of different social media sources (e.g., news sites, blogs, bulletin boards, messaging applications and websites, product review websites, etc.). The SMM computer device 115 analyzes unstructured text from the conversations and extracts sentiment from the text. Based on the sentiment, the SMM computer device 115 organizes the text into various topics and inputs the topics into a statistical model to correlate the topics to the sales volume of the product. This correlation indicates how sales volume of the product is affected by the social media conversations.

Figure 5:
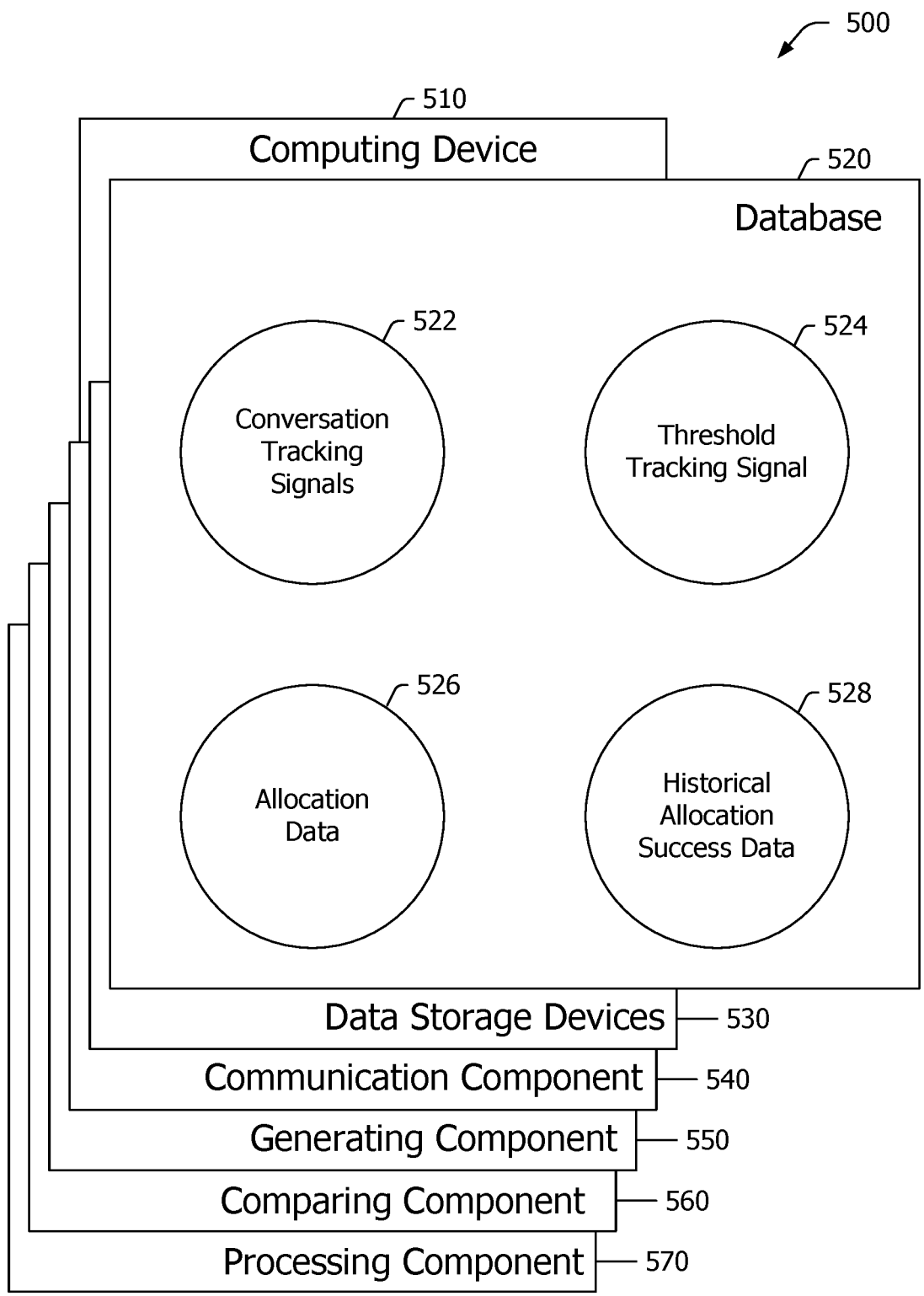

FIG. 5 is a diagram 500 of components of one or more example computing devices that may be used in the system 100 (shown in FIG. 1). In some embodiments, the computing device 510 is similar to the SMIA computer device 105 (shown in FIG. 1). The database 520 may be coupled with several separate components within the computing device 510, which perform specific tasks. In this embodiment, the database 520 includes the conversation tracking signals 522, a threshold tracking signal 524, the allocation data 526, and the historical allocation success data 528. In some embodiments, the database 520 is similar to the database 125 (shown in FIG. 1).

The computing device 510 includes the database 520, as well as the data storage devices 530. The computing device 510 also includes a communication component 540 for receiving conversation tracking signals for monitoring. The computing device 510 also includes a generating component 550 for generating the threshold tracking signal. A comparing component 560 compares the current social media conversation tracking signal to the threshold tracking signal. A processing component 560 assists with execution of computer-executable instructions associated with the system.

As noted above, in some embodiments, the SMIA computer device 105 allocates resources directly, i.e. automatically, in response to the social media conversations. For example, to efficiently and effectively allocate resources in response to negative conversation activity, the SMIA computer device 105 determines an escalation level of the conversation activity from a plurality of predefined escalation levels. The escalation levels correspond to an increasing negative or positive trend in social media conversations regarding the product, as indicated by a magnitude of at least one tracking signal associated with the product. The escalation levels are each associated with corresponding trigger criteria and a corresponding resource allocation that may be immediate and automatic. The trigger criteria for each escalation level include, for example, a sales impact range and a content category. The content category is compared to the content/language of the conversation activity associated with the tracking signal, and may be based on keywords and/or a degree of sentiment appearing in the conversation, as provided with the tracking signal. The sales impact range is compared to a magnitude of a predicted negative or positive predicted future sales impact on the product, as provided with the tracking signal. The SMIA computer device 105 may be configured to compare any of the currently received tracking signals to the trigger criteria for a plurality of escalation levels in response to detection by the SMIA computer device 105 of a deviation of the tracking signal from the average or threshold conversation activity by a predetermined amount, and/or any other trigger criteria that enables the SMIA computer device 105 to function as described herein.

In some embodiments, the plurality of predefined escalation levels includes, for example, at least three escalation levels, including a first, second, and third escalation level. However, it should be understood that there may be any number of predefined escalation levels as desired for a particular application.

For example, the first escalation level is the lowest escalation level and is reached when the social media conversation activity driving the tracking signal includes content indicating inconvenience or temporary discomfort associated with the product but no reputational risk, and a negative sales impact associated with the tracking signal is within a first range that is less than a first limit, such as 0.01 percent. In some embodiments, the first limit is selectively re-definable based on a persistence of the conversation.

When the tracking signal is determined to be at the first escalation level, the SMIA computer device 105 automatically allocates resources to mitigate the deviation in the conversation activity in a manner appropriate for the first escalation level. For example, the SMIA computer device 105 automatically provides responses to posts and/or comments of individual posters on social media platforms to provide apologies, discounts, promotions, and/or advertisements informing users of improvements or changes made to the product. To provide the automatic responses, the SMIA computer device 105 accesses a set of standard, pre-defined responses stored in database 125. Based on the keywords or other topic content indication associated with the tracking signal 600, the SMIA computer device 105 selects and provides a proper response appropriate for the first escalation level. Alternatively, the SMIA computer device 105 implements any suitable automatic allocation of resources. In some embodiments, an on-line social media platform where the response provided by the SMIA computer device 105 is to be posted inhibits automated posting by computer devices, and the SMIA computer device 105 alerts a human operator to complete the automated posting, albeit with no discretion as to the response required on the part of the human operator. In other embodiments, the SMIA computer device 105 automatically posts the response directly to the on-line social media platform with no operator action required. Alternatively, the SMIA computer device 105 alerts a human operator, and the human operator exercises discretion to approve of an automatically selected response or to manually provide a response. In alternative embodiments, the resource allocations described above are associated with any suitable escalation level.

The second escalation level is associated with a larger deviation of the conversation activity from the average conversation activity than that of the first escalation level. For example, the second escalation level is reached when the social media conversation activity associated with the tracking signal includes content indicating short-term, limited health issues associated with the product, or when the negative sales impact associated with the tracking signal is within a second range that equals or exceeds the first limit and is less than a second limit, such as 0.02 percent. In some embodiments, the second limit is selectively re-definable based on a persistence of the conversation.

When the conversation activity tracking signal is determined to be at the second escalation level, the SMIA computer device 105 automatically allocates resources to mitigate the deviation in the conversation activity in a manner appropriate for the second escalation level. Because the second escalation level is associated with a larger deviation from the average conversation activity for a product than the first escalation level, additional action beyond the automatic responses to the individual posters on social media platforms provided for the first escalation level may be necessary to mitigate the deviation of the conversation activity tracking signal. For example, in addition to responding to each poster of complaints on the social media platforms as with the first escalation level, the SMIA computer device 105 automatically selects pre-defined advertisement content from the database 125 to address or counteract the keywords or other topic content indication associated with the tracking signal 600, and increases advertisement placement distribution and frequency across one or more social media platforms using the advertisement content. Alternatively, the SMIA computer device 105 implements any suitable automatic allocation of resources. The increased advertisements may be scheduled over a predefined length of time (i.e., one day, one week, etc.) before reverting back to a normal distribution and frequency, or alternatively may be scheduled to persist until the tracking signal de-escalates from the second escalation level. Alternatively, the SMIA computer device 105 alerts a human operator, and the human operator approves of an automatically selected response or manually provides a response. In alternative embodiments, the response actions described above are associated with any suitable escalation level.

The third escalation level is associated with a larger deviation of the conversation activity from the average conversation activity than the first and second escalation levels. In particular, the third escalation level is considered to sufficiently serious to warrant automatic referral to designated decision-making personnel, for example, personnel associated with managing the product and/or consumer relations for the product. For example, the third escalation level is reached when the social media conversation activity associated with the tracking signal includes content indicating a significant negative health impact associated with the product or a significant negative impact to a reputation of the product, or when the negative sales impact associated with the tracking signal is within a third range that equals or exceeds the second limit.

When the tracking signal is determined to be at the third escalation level, the SMIA computer device 105 automatically allocates resources to mitigate the deviation in the conversation activity in a manner appropriate for the third escalation level. Because the third escalation level is indicative of a much higher risk of damage to product reputation and negative sales impact than the first and second escalation levels, more significant intervention than automatic responses to individual posters on social media platforms and increased on-line advertisements may be necessary to mitigate the negative conversation activity. For example, for posting of responses to individual posts/comments and/or automatic increases in on-line advertising, as described above, the SMIA computer device 105 may suggest a statement to address keywords or other topic content indication associated with the tracking signal 600, and appropriate for the third escalation level, from a set of standard statements stored in the database 125. Additionally, the SMIA computer device 105 may automatically select the statement as a press release for one or more traditional media platforms, such as print media, television, and/or radio outlets. The statement for such on-line responses, on-line advertisements, and press releases may include one or more of apologies, indications of investigations being opened, product recalls, and/or descriptions of changes being made to the product, etc. The SMIA computer device 105 is configured to transmit the suggested statement to the designated decision-making personnel, for example via email with an accompanying text alert to a personal communication device of the designated decision-making personnel, so that appropriate additions or changes to the statement can be made and/or additional actions can be taken prior to posting the statement on social media platforms and/or issuing the statement as a press release. In some embodiments, the alerts to the designated decision-making personnel being transmitted immediately upon triggering of the third escalation level, by a communication channel different from the transmission of the suggested statement (e.g., text versus email), facilitates awareness and attention by the designated decision-making personnel at the earliest possible moment, as required by the seriousness of the content of the social media conversations. Moreover, the automated handling of the first and second escalation levels assures the designated decision-making personnel that they will receive personal alerts only for relatively serious social media conversation trends, facilitating heightened awareness and attention to such alerts by the designated decision-making personnel. In the example embodiment, once a final version of the suggested statement has been approved by the designated decision-making personnel, the SMIA computer device 105 then posts the statement on social media platforms as described above and/or transmits the final statement as a press release to the relevant traditional media outlets. In alternative embodiments, the response actions described above are associated with any suitable escalation level.

In certain embodiments, the plurality of escalation levels includes additional escalation levels beyond the third escalation level. For example, the third escalation level is further defined to include social media conversation content indicating a significant negative, but temporary, health impact associated with the product or a significant negative, but temporary, impact to the reputation of the product, or when the negative sales impact associated with the tracking signal is within the third range that equals or exceeds the second limit and is less than a third limit, such as 0.03 percent. A fourth escalation level is associated with a larger deviation of the conversation activity from the average conversation activity than the first, second, and third escalation levels. In particular, the fourth escalation level is reached when the social media conversation activity associated with the tracking signal includes content indicating a significant permanent negative health impact associated with the product or a significant permanent negative impact to a reputation of the product, or when the negative sales impact associated with the tracking signal is within a fourth range that equals or exceeds the third limit. In some embodiments, the third limit is selectively re-definable based on a persistence of the conversation. Although limits such as the first, second, and third limits are described for comparison to the negative sales impact correlated to the tracking signal, additionally or alternatively limits are implemented for comparison to another suitable value associated with the tracking signal, such as a magnitude of the tracking signal or a magnitude of the deviation of the tracking signal from the threshold tracking signal.

When the tracking signal is determined to be at the fourth escalation level, the SMIA computer device 105 automatically responds to mitigate the deviation in the conversation activity in a manner appropriate for the fourth escalation level. Because the fourth escalation level is indicative of a risk of permanent damage to product reputation and permanent negative sales impact, more significant intervention, as compared to the other escalation levels, may be necessary to mitigate the negative conversation activity. For example, for selection of the response statement for on-line responses to specific posts and comments, on-line general ad placement, and press releases to traditional outlets, as described above, the SMIA computer device 105 may suggest a statement appropriate for the fourth escalation level from a database of standard statements. In some such embodiments, the automatically selected fourth statement may refer not just to a specific product that is driving the social media conversation, but also to the overall brand or division under which the product is marketed. The SMIA computer device 105 also transmits the suggested statement to the designated decision-making personnel associated with the fourth escalation level for appropriate additions or changes to the statement and/or additional actions as described above. For example, the designated decision-making personnel for the fourth escalation level include not just personnel associated with managing the specific product and/or consumer relations for the specific product, but also personnel associated with managing the overall brand or division under which the product is marketed and/or consumer relations for the overall brand or division under which the product is marketed. Thus, personnel tasked with handling potential impacts of the social media conversation on other products within the brand or division are alerted and provided with automatically selected response templates at the earliest possible time after a fourth level escalation event is detected.

It should be noted that involvement of designated decision-making personnel for the overall brand or division under which the product is marketed need not be associated with, or solely with, the fourth escalation level. In alternative embodiments, designated personnel for the overall brand or division under which the product is marketed are associated with any suitable escalation level, or no escalation level. For another example, in some embodiments, if the social media conversation driving the tracking signal expressly focuses on a brand or division, the designated decision-making personnel are automatically selected to be the personnel for the targeted brand or division.

In some embodiments, once an escalation level has been triggered, the SMIA computer device 105 maintains the allocation of resources corresponding to at least the triggered escalation level until a predefined feedback condition is detected in the tracking signal. For example, after a particular escalation level is triggered, the value of the tracking signal on a subsequent day no longer satisfies the conditions associated with either the triggered escalation level or a higher escalation level. Nevertheless, the SMIA computer device 105 maintains the allocation of resources corresponding to the triggered escalation level until an additional predefined feedback condition is determined. In some embodiments, the predefined feedback condition occurs when the tracking signal decreases below the threshold tracking signal. In response to the SMIA computer device 105 detecting the predefined feedback condition in the tracking signal, the SMIA computer device 105 de-escalates from the previously triggered escalation level and enters the escalation level, if any, associated with the current value of the tracking signal. In alternative embodiments, any suitable feedback condition is used. Waiting until the additional feedback condition is satisfied to de-escalate from the triggered escalation level facilitates certainty in determining that a negative trend in social media conversations about the product has discontinued before responses appropriate to the triggered escalation level are discontinued. In alternative embodiments, the SMIA computer device 105 de-escalates from the triggered escalation level when the value of the tracking signal on a subsequent day no longer satisfies the conditions associated with either the triggered escalation level or a higher escalation level, without requiring an additional predefined feedback condition.

In the example embodiment, after a lower escalation level has been triggered, if the SMIA computer device 105 determines that the predicted future sales impact of the tracking signal subsequently has escalated to within the sales impact range of a higher escalation level, the SMIA computer device 105 is configured to re-allocate resources automatically according to the resource allocation rules defined for the higher escalation level.

It should be noted that, because the threshold tracking signal in certain embodiments is a running average based on recent historical data for tracking signal 600, the threshold tracking signal may rise during an escalation event, and in such cases the tracking signal may remain within an escalation range despite falling below the threshold tracking signal in response to the measures implemented by the SMIA computer device 105.

Figure 6:
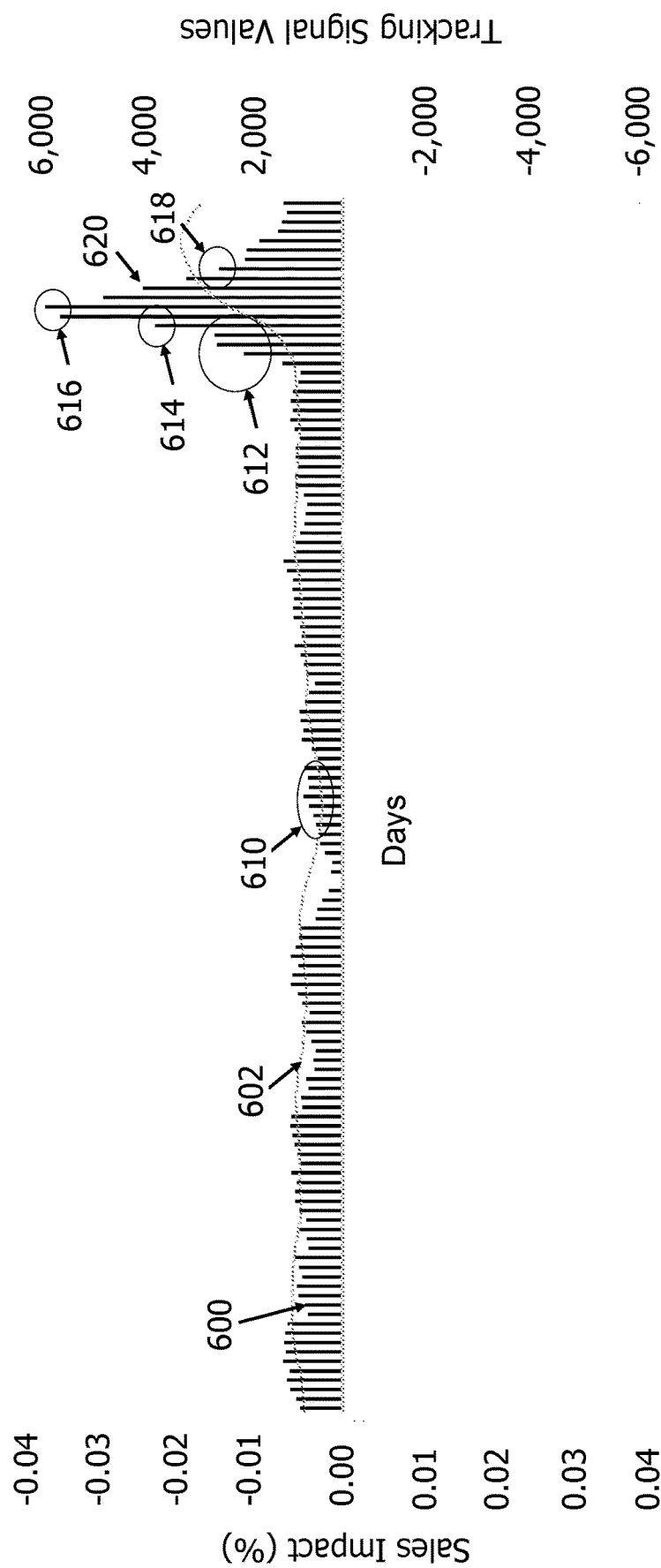

FIG. 6 is a diagram of an example of a social media conversation tracking signal 600 that may be used by SMIA computer device 105. For example, but not by way of limitation, the social media conversation tracking signal 600 is transmitted in real time to the SMIA computer device 105 from the SMM computer device 115, which may be embodied as a Voice of Consumer social media monitoring platform provided by Kvantum, Inc. In the example embodiment, a value of the social media conversation tracking signal 600 is received daily based on content mined from social media conversations referencing the product (or suite of products, or brand, or division, etc.) of interest. In alternative embodiments, the value of the tracking signal 600 is received at any suitable interval.

The value of the tracking signal 600, shown in dimensionless units on the right-hand vertical scale, also represents a value of a predicted impact by the social media conversation on sales of the product of interest, as correlated by the SMM computer device 115, expressed in units of percentage sales change on the left-hand vertical axis. In the example embodiment, the correlated predicted sales impact value is provided by the SMM computer device 115 along with the social media conversation tracking signal 600. A threshold tracking signal 602 is also illustrated. In the example embodiment, the threshold tracking signal 602 is calculated as a suitable running average of the plurality of received social media conversation tracking signals received daily over a suitable recent time window period, such as the most recent past week, as discussed above. In alternative embodiments, the threshold tracking signal 602 is calculated in any other suitable fashion based on weighted historical values of the tracking signal 600. The threshold tracking signal 602 may either be provided by the SMM computer device 115, or calculated by the SMIA computer device 105 as described above from the received social media conversation tracking signal 600.

Although only one social media conversation tracking signal 600 is shown, the SMIA computer device 105 may receive a plurality of social media conversation tracking signals 600 from the SMM computer device 115, each based on a different category of content of the social media conversations. The categories of content may be dynamically determined by the SMM computer device 115, and the keywords or other content topic indicators of the social media conversations associated with each tracking signal 600 may be provided in association with the tracking signal 600. The response methodology based on escalation levels, as described above, may be applied by the SMIA computer device 105 separately to each tracking signal 600.

In the example embodiment illustrated in FIG. 6, the product being monitored is a diaper. The SMIA computer device 105 implements the four escalation levels as described above, with limits defined for comparison to the predicted impact on sales of the diaper associated with the tracking signal 600. In particular, the first limit is set at 0.01 percent, the second limit is set at 0.02 percent, and the third limit is set at 0.03 percent.

An event at the first escalation level is illustrated at 610. At event 610, the tracking signal 600 exceeds the threshold tracking signal 602, and the predicted negative sales impact associated with the tracking signal 600 remains below 0.01 percent. In addition, the keywords in the social media conversations about the diaper product driving the tracking signal 600 include terms such as "leak," "disappointing," and "frustrated," which are associated in the database 125 with inconvenience or temporary discomfort associated with the product but no reputational risk. In response, the SMIA computer device 105 accesses a set of standard, pre-defined responses for the first escalation level stored in the database 125, and automatically selects an appropriate response for posting into the social media conversations based on the keywords.

An event at the second escalation level is illustrated at 612. At event 612, the tracking signal 600 exceeds the threshold tracking signal 602. The keywords in the social media conversations about the diaper product do not implicate any health or reputational concerns as associated with the second escalation level. However, the predicted negative sales impact associated with the tracking signal 600 exceeds 0.01 percent, but remains below 0.02 percent, thus triggering the second escalation level. In response, the SMIA computer device 105 accesses a set of standard, pre-defined responses stored in the database 125 for the second escalation level, and automatically selects an appropriate response for posting into the social media conversations based on the keywords. Additionally, the SMIA computer device 105 automatically increases advertisement placement distribution and frequency across one or more social media platforms with ads selected from database 125 to address or counteract the complaints.

An event at the third escalation level is illustrated at 614. At event 614, the tracking signal 600 further exceeds the threshold tracking signal 602. The keywords in the social media conversations about the diaper product do not implicate any health or reputational concerns as associated with the second escalation level. However, the predicted negative sales impact associated with the tracking signal 600 exceeds 0.02 percent, but remains below 0.03 percent, thus triggering the third escalation level. In response, the SMIA computer device 105 accesses a set of pre-defined statement templates stored in the database 125 for the third escalation level, automatically selects an appropriate statement, and automatically transmits the suggested statement to the designated decision-making personnel associated with the diaper product, so that appropriate additions or changes to the statement can be made and/or additional actions can be taken by the designated decision-making personnel prior to posting the statement on social media platforms and/or issuing the statement as a press release.

An event at the fourth escalation level is illustrated at 616. At event 616, the tracking signal 600 exceeds the threshold tracking signal 602. The keywords in the social media conversations about the diaper product driving the tracking signal 600 include terms such as "return" and "serious," which are associated in database 125 with a risk of permanent damage to product reputation, triggering the fourth escalation level. Additionally, the predicted negative sales impact associated with the tracking signal 600 exceeds 0.03 percent, which is also sufficient to trigger the fourth escalation level. In response, the SMIA computer device 105 accesses a set of pre-defined statement templates stored in the database 125 for the fourth escalation level, automatically selects an appropriate statement, and automatically transmits the suggested statement to the designated decision-making personnel associated with the diaper product, so that appropriate additions or changes to the statement can be made and/or additional actions can be taken by the designated decision-making personnel prior to posting the statement on social media platforms and/or issuing the statement as a press release. In particular, in the example embodiment, the suggested statement addresses consumer goodwill associated with a brand or division under which the product is marketed.

A de-escalation event is illustrated at 618. More specifically, although a value 620 of the tracking signal on a day subsequent to the fourth escalation level event 616 no longer satisfies the conditions associated with the triggered fourth escalation level, because the correlated negative sales impact has fallen below the third limit of 0.03, the SMIA computer device 105 maintains the fourth escalation level until a predefined feedback condition is detected in the tracking signal 600. In the example embodiment, the predefined feedback condition occurs when the tracking signal 600 falls below the threshold tracking signal 602 at de-escalation event 618. At de-escalation event 618, the predicted negative sales impact associated with the tracking signal 600 exceeds 0.01 percent, but remains below 0.02 percent, thus automatically causing the SMIA computer device 105 to revert to the second escalation level. Thus, for example, the SMIA computer device 105 avoids requiring the designated decision-making personnel to repeat the steps associated with the intermediate third escalation level, further reducing a need for time-intensive hands-on response management by human operators and automatically allocating consumer relations resources in a more efficient manner.

Figure 7:
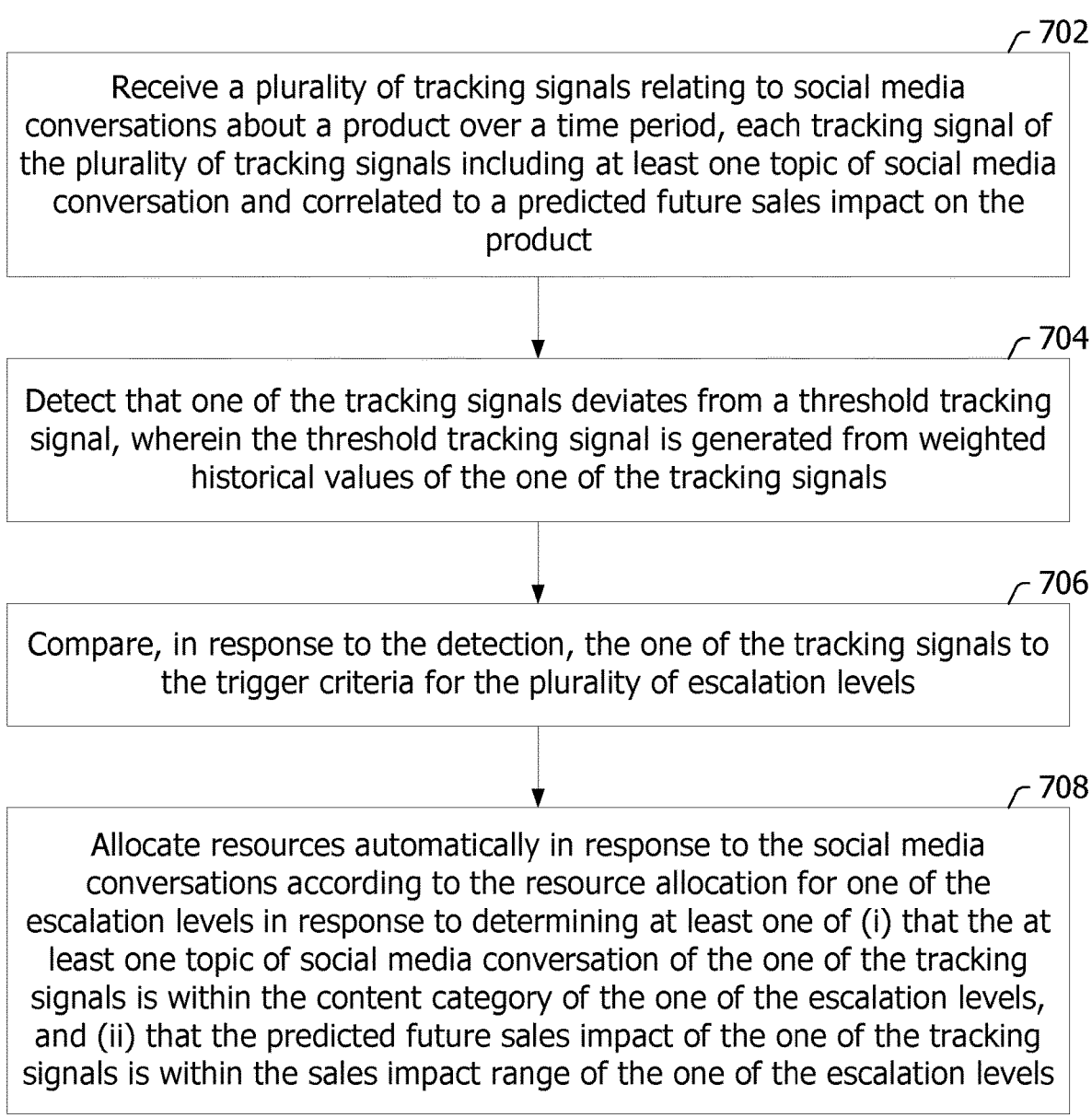

FIG. 7 is a flow chart of a process 700 for allocating resources in response to the social media conversations using the social media impact analysis system 100 (shown in FIG. 1). In the example embodiment, the process 700 is performed by the SMIA computer device 105 (shown in FIG. 1). SMIA computer device 105 includes processor 305 (shown in FIG. 3) and a memory device, such as database 125 (shown in FIG. 1). The memory device stores, for each of a plurality of escalation levels, a corresponding trigger criteria and a corresponding resource allocation. Each of the corresponding trigger criteria includes a sales impact range and a content category.

In the exemplary embodiment, the SMIA computer device 105 receives 702 a plurality of tracking signals relating to social media conversations about a product over a time period. Each tracking signal of the plurality of tracking signals includes at least one topic of social media conversation and is correlated to a predicted future sales impact on the product.

The SMIA computer device 105 detects 704 that one of the tracking signals deviates from a threshold tracking signal, wherein the threshold tracking signal is generated from weighted historical values of the one of the tracking signals.

In response to the detection, the SMIA computer device 105 compares 706 the one of the tracking signals to the trigger criteria for the plurality of escalation levels.

The SMIA computing device 105 allocates 708 resources automatically in response to the social media conversations according to the resource allocation for one of the escalation levels in response to determining at least one of (i) that the at least one topic of social media conversation of the one of the tracking signals is within the content category of the one of the escalation levels, and (ii) that the predicted future sales impact of the one of the tracking signals is within the sales impact range of the one of the escalation levels.

In one embodiment, allocating resources in response to the social media conversations according to the resource allocation for the one of the escalation levels includes selecting, by the SMIA computing device 105, from the at least one memory device a pre-defined response corresponding to the at least one topic of the one of tracking signals and the one of the escalation levels, and automatically posting, by the SMIA computing device 105, the response to an individual poster directly on a social media platform.

In one embodiment, allocating resources in response to the social media conversations according to the resource allocation for the one of the escalation levels includes selecting, by the SMIA computing device 105, from the at least one memory device a pre-defined response corresponding to the at least one topic of the one of tracking signals and the one of the escalation levels. The SMIA computing device 105 automatically posts the response to an individual poster on a social media platform, wherein the social media platform inhibits automated posting by computer devices. The SMIA computing device 105 then alerts a human operator to complete the automated posting.

In one embodiment, method 700 further includes determining, by the SMIA computing device 105, that the predicted future sales impact of the one of the tracking signals subsequently has escalated to within the sales impact range of a higher one of the escalation levels, and re-allocating resources, by the SMIA computing device 105, automatically in accordance with the resource allocation corresponding to the higher escalation level.

In one embodiment, re-allocating resources automatically in accordance with the resource allocation corresponding to the higher escalation level includes selecting from the at least one memory device a pre-defined suggested statement corresponding to the at least one topic of the one of tracking signals and the higher escalation level, and transmitting the suggested statement to designated decision-making personnel.

In one embodiment, re-allocating resources automatically in accordance with the resource allocation corresponding to the higher escalation level further includes transmitting an alert to the designated decision-making personnel using a communication channel different from the transmission of the suggested statement.

In one embodiment, method 700 further includes maintaining, by the SMIA computing device 105, the re-allocation of resources according to the resource allocation for the higher escalation level until a predefined feedback condition is detected in the tracking signal.

Figure 8:
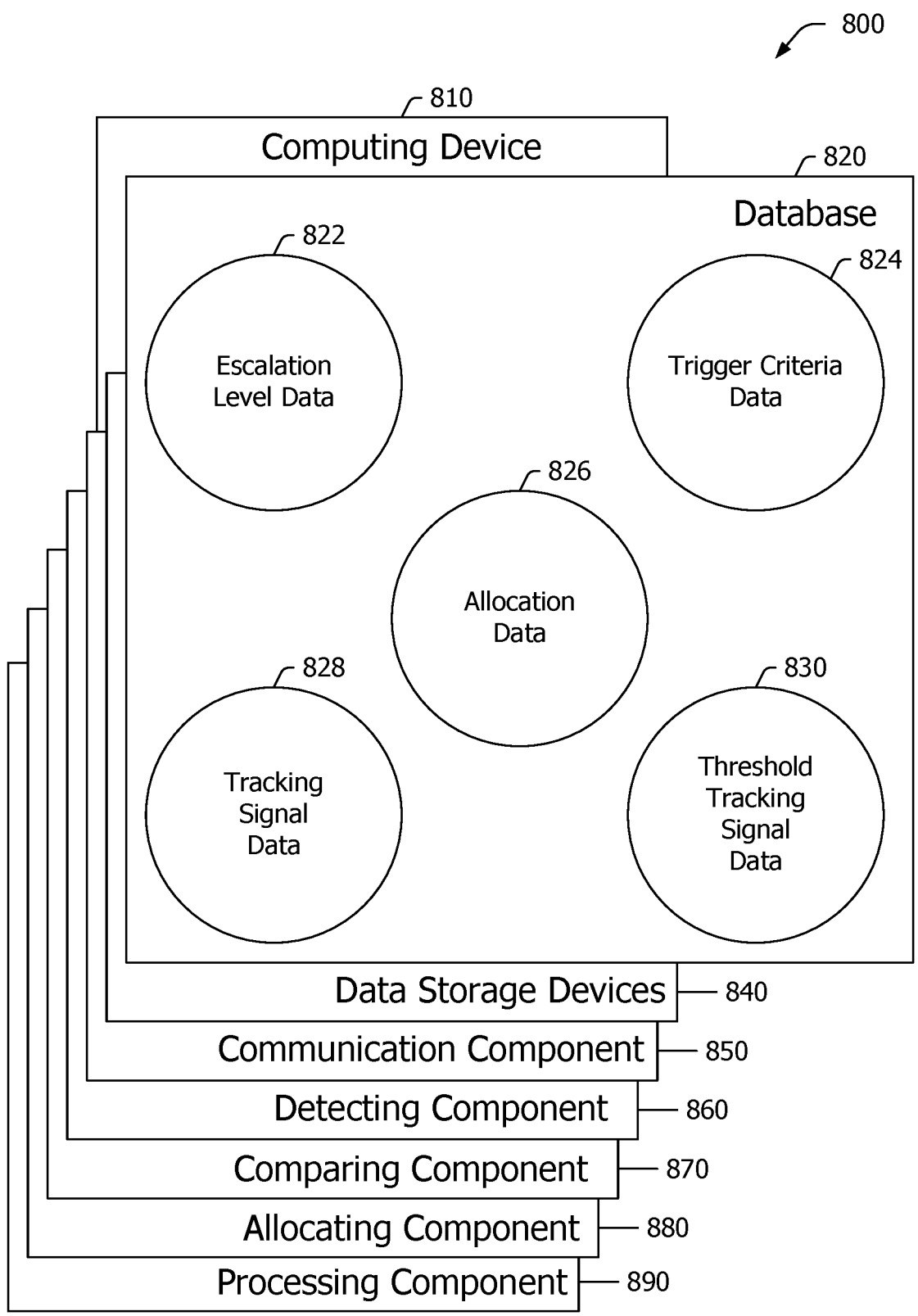

FIG. 8 is a diagram 800 of components of one or more example computing devices that may be used in the system 100 (shown in FIG. 1). In some embodiments, the computing device 810 is similar to the SMIA computer device 105 (shown in FIG. 1). The database 820 may be coupled with several separate components within the computing device 810, which perform specific tasks. In this embodiment, the database 820 includes escalation level data 822, trigger criteria data 824, allocation data 826, tracking signal data 828, and threshold tracking signal data 830. In some embodiments, the database 820 is similar to the database 125 (shown in FIG. 1).

The computing device 810 includes the database 820, as well as the data storage devices 840. The computing device 810 also includes a communication component 850 for receiving the tracking signals for monitoring. The computing device 810 also includes a detecting component 860 for detecting one of the tracking signals deviates from the threshold tracking signal. A comparing component 870 compares the one of the tracking signals to the trigger criteria. An allocating component 880 automatically allocates the resources. A processing component 890 assists with execution of computer-executable instructions associated with the system.

Although examples of the plurality of escalation levels are described above in terms of responding to tracking signals correlating to negative sales impact, it should be understood that another plurality escalation levels associated with tracking signals correlating to positive sales impact may similarly be defined at the SMIA computer device 105, thus improving efficiency in capitalizing on a positive social media conversation regarding the product. For example, the SMIA computer device 105 is configured to respond to a first positive escalation level by cross-posting positive comments or reviews to other social media platforms, is configured to respond to a second positive escalation level by automatically ordering increased inventory of the product at select retailers to accommodate a predicted positive sales impact, and is configured to respond to a third positive escalation level by automatically alerting the designated decision-making personnel associated with the product that an extension of the product line or cross-branding with another product should be discussed in order to leverage the detected goodwill.

In contrast to known systems for responding to social media conversations, which rely on an uncoordinated or loosely coordinated series of discretionary social media response decisions each based on a scattered "snapshot" or isolated portion of a far-ranging, dynamic, and rapidly evolving social media conversation, embodiments of the systems and methods described herein automatically select responses to social media conversations according to an ordered set of rules, in a consistent and efficient manner, based on repeatable and consistent measurements of the impact of social media conversations. The embodiments limit discretionary involvement of human operators to cases that reach a predetermined and well-defined positive or negative impact threshold, thereby reducing a need for time-intensive hands-on response management by human operators and automatically allocating consumer relations resources in a more efficient manner. Moreover, some embodiments cause the selected responses to be automatically re-scaled in response to feedback from the tracking signal, further improving efficiency and limiting unintended and/or unexpected negative results that may be caused by human operators despite the best of intentions.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as conversation tracking signals, a threshold tracking signal, allocation data, and historical allocation success data, and other data. The machine learning programs may utilize deep learning algorithms that may be primarily focused on pattern recognition, and may be trained after processing multiple examples. The machine learning programs may include Bayesian program learning (BPL), image or object recognition, optical character recognition, pixel recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract conversation tracking signals, a threshold tracking signal, allocation data, and historical allocation success data, and other data.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As described above, the implementations described herein relate to analyzing social media, and more specifically, to allocating resources in response to the social media conversations. More specifically, a social media impact analysis (SMIA) computer device (also known as a SMIA server) receives and monitors a plurality of social media conversation tracking signals relating to a product over a time period. The SMIA computer device generates a threshold tracking signal by averaging the plurality of received social media conversation tracking signals over the time period. The SMIA computer device compares a current social media conversation tracking signal to the threshold tracking signal and allocates resources in response to the social media conversations to achieve a positive impact on sales.

The above-described methods and systems for social media impact analysis are cost-effective, secure, and highly reliable. The methods and systems provide an understanding of social media conversations regarding a product or service provided by a target entity and how the conversations impact future sales of the product or service. This enables the target entity to take action to respond to the conversations and mitigate against the impact of negative conversations and/or leverage positive conversations to drive a positive impact on sales.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A social media impact analysis (SMIA) computer device comprising at least one processor in communication with at least one memory device, the at least one memory device storing, for each of a plurality of escalation levels, a corresponding trigger criteria and a corresponding resource allocation, each of the corresponding trigger criteria including a sales impact range and a content category, said SMIA computer device configured to:

analyze unstructured data from a plurality of social media conversations from a plurality of social media sources including news sites, blogs, bulletin boards, messaging applications and websites, and product review websites;

determine a plurality of tracking signals relating to the plurality of social media conversations about a product over a time period based upon the analysis, wherein each tracking signal of the plurality of tracking signals including at least one topic of social media conversation and correlated to a predicted future sales impact on the product, wherein the plurality of tracking signals are related to sentiment detected on a plurality of channels of public communication;

detect that one of the tracking signals deviates from a threshold tracking signal, wherein the threshold tracking signal is generated from weighted historical values of the one of the tracking signals;

compare, in response to the detection, the one of the tracking signals to the trigger criteria for the plurality of escalation levels, wherein the trigger criteria for each successive escalation level corresponds to an increasing negative trend in the social media conversations;

determine a current escalation level based upon the plurality of escalation levels and the comparison;

automatically generate and submit a response to counteract the increasing negative trend according to the current escalation level of the plurality of escalation levels in response to determining that (i) the at least one topic of social media conversation of the one of the tracking signals is within the content category of the current escalation level, and (ii) the predicted future sales impact of the one of the tracking signals is within the sales impact range of the current escalation level;

when the current escalation level is a first escalation level, select from the at least one memory device a pre-defined response corresponding to the at least one topic of the one of tracking signals and the first escalation level; and automatically post the response to an individual poster directly on a social media platform.

2. The SMIA computer device in accordance with claim 1, wherein when the current escalation level is a first escalation level said SMIA computer device is further configured to counteract the increasing negative trend for the first escalation level by:

selecting from the at least one memory device a pre-defined response corresponding to the at least one topic of the one of tracking signals and the first escalation level; and attempting to automatically post the response to an individual poster on a social media platform, wherein the social media platform inhibits automated posting by computer devices; and alerting a human operator to complete the automated posting.

3. The SMIA computer device in accordance with claim 1, wherein said SMIA computer device is further configured to:

allocate resources automatically to counteract the increasing negative trend according to the resource allocation for another of the escalation levels in response to determining at least one of (i) that the at least one topic of social media conversation of the one of the tracking signals is within the content category of the other of the escalation levels, and (ii) that the predicted future sales impact of the one of the tracking signals is within the sales impact range of the other of the escalation levels.

4. The SMIA computer device in accordance with claim 3, wherein said SMIA computer device is further configured to allocate resources to counteract the increasing negative trend according to the resource allocation for the other of the escalation levels by:

selecting from the at least one memory device a pre-defined suggested statement corresponding to the at least one topic of the one of tracking signals and the other of the escalation levels; and transmitting the suggested statement to designated decision-making personnel.

5. The SMIA computer device in accordance with claim 4, wherein said SMIA computer device is further configured to transmit an alert to the designated decision-making personnel using a communication channel different from the transmission of the suggested statement.

6. The SMIA computer device in accordance with claim 4, wherein said SMIA computer device is further configured to:

receive approval of a final version of the suggested statement from the designated decision-making personnel; and transmit the final version of the statement as a press release to a traditional media outlet.

7. The SMIA computer device in accordance with claim 4, wherein the content category stored for the other of the escalation levels comprises content indicating at least one of a significant negative health impact associated with the product and a significant negative impact to a reputation of the product.

8. The SMIA computer device in accordance with claim 4, wherein said SMIA computer device is further configured to maintain the allocation of resources to counteract the increasing negative trend according to the resource allocation for the other of the escalation levels until a predefined feedback condition is detected in the tracking signal.

9. The SMIA computer device in accordance with claim 8, wherein the predefined feedback condition comprises the one of the tracking signals decreasing below the corresponding threshold tracking signal.

10. The SMIA computer device in accordance with claim 4, wherein when the current escalation level is a third escalation level, wherein the at least one memory device stores a first sales impact range for a first level, a second sales impact range for a second escalation level of the escalation levels, and a third sales impact range for the third escalation level, wherein the first sales impact range is less than a first limit, the second sales impact range exceeds the first limit and is less than a second limit, and the third sales impact range exceeds the second limit.

11. The SMIA computer device in accordance with claim 10, wherein when the current escalation level is a second escalation level said SMIA computer device is further configured to allocate resources to counteract the increasing negative trend according to the resource allocation for the second escalation level by:

selecting pre-defined advertisement content from the at least one memory device corresponding to the at least one topic associated with the one of the tracking signals; and increasing advertisement placement distribution and frequency across one or more social media platforms using the advertisement content.

12. A method for allocating resources in response to social media conversations, said method implemented using a social media impact analysis (SMIA) computer device, the SMIA computer device including at least one processor in communication with at least one memory device, the at least one memory device storing, for each of a plurality of escalation levels, a corresponding trigger criteria and a corresponding resource allocation, each of the corresponding trigger criteria including a sales impact range and a content category, said method comprising:

analyzing, by the SMIA computing device, unstructured data from a plurality of social media conversations from a plurality of social media sources including news sites, blogs, bulletin boards, messaging applications and websites, and product review websites;

determining, by the SMIA computing device, a plurality of tracking signals relating to the plurality of social media conversations about a product over a time period based upon the analysis, wherein each tracking signal of the plurality of tracking signals including at least one topic of social media conversation and correlated to a predicted future sales impact on the product, wherein the plurality of tracking signals are related to sentiment detected on a plurality of channels of public communication;

detecting, by the SMIA computing device, that one of the tracking signals deviates from a threshold tracking signal, wherein the threshold tracking signal is generated from weighted historical values of the one of the tracking signals;

in response to detecting that the tracking signal deviates, comparing, by the SMIA computing device in response to the detection, the one of the tracking signals to the trigger criteria for the plurality of escalation levels, wherein the trigger criteria for each successive escalation level corresponds to an increasing negative trend in the social media conversations;

determining, by the SMIA computing device, a current escalation level based upon the plurality of escalation levels and the comparison;

automatically generating and submitting, by the SMIA computing device, a response to counteract the increasing negative trend according to the current escalation level of the plurality of escalation levels in response to determining at least one of (i) that the at least one topic of social media conversation of the one of the tracking signals is within the content category of the current escalation level, and (ii) that the predicted future sales impact of the one of the tracking signals is within the sales impact range of the current escalation level;

when the current escalation level is a first escalation level, selecting, by the SMIA computing device, from the at least one memory device a pre-defined response corresponding to the at least one topic of the one of tracking signals and the current escalation level; and automatically posting, by the SMIA computing device, the response to an individual poster directly on a social media platform.

13. The method in accordance with claim 12, wherein when the current escalation level is a first escalation level to counteract the increasing negative trend for the current escalation level comprises:

selecting, by the SMIA computing device, from the at least one memory device a pre-defined response corresponding to the at least one topic of the one of tracking signals and the current escalation level;

attempting to automatically post, by the SMIA computing device, the response to an individual poster on a social media platform, wherein the social media platform inhibits automated posting by computer devices; and alerting, by the SMIA computing device, a human operator to complete the automated posting.

14. The method in accordance with claim 12, further comprising:

determining, by the SMIA computing device, that the predicted future sales impact of the one of the tracking signals subsequently has escalated to within the sales impact range of a higher one of the escalation levels; and re-allocating resources, by the SMIA computing device, automatically in accordance with the resource allocation corresponding to the higher escalation level.

15. The method in accordance with claim 14, wherein re-allocating resources automatically in accordance with the resource allocation corresponding to the higher escalation level comprises:

selecting from the at least one memory device a pre-defined suggested statement corresponding to the at least one topic of the one of tracking signals and the higher escalation level; and transmitting the suggested statement to designated decision-making personnel.

16. The method in accordance with claim 15, wherein re-allocating resources automatically in accordance with the resource allocation corresponding to the higher escalation level further comprises transmitting an alert to the designated decision-making personnel using a communication channel different from the transmission of the suggested statement.

17. The method in accordance with claim 14, further comprising maintaining, by the SMIA computing device, the re-allocation of resources according to the resource allocation for the higher escalation level until a predefined feedback condition is detected in the tracking signal.

18. At least one non-transitory computer-readable storage media having computer-executable instructions embodied thereon, wherein when executed by at least one processor in communication with at least one memory device, the at least one memory device storing, for each of a plurality of escalation levels, a corresponding trigger criteria and a corresponding resource allocation, each of the corresponding trigger criteria including a sales impact range and a content category, the computer-executable instructions cause the at least one processor to:

analyze unstructured data from a plurality of social media conversations from a plurality of social media sources including news sites, blogs, bulletin boards, messaging applications and websites, and product review websites;

determine a plurality of tracking signals relating to the plurality of social media conversations about a product over a time period based upon the analysis, wherein each tracking signal of the plurality of tracking signals including at least one topic of social media conversation and correlated to a predicted future sales impact on the product, wherein the plurality of tracking signals are related to sentiment detected on a plurality of channels of public communication;

detect that one of the tracking signals deviates from a threshold tracking signal, wherein the threshold tracking signal is generated from weighted historical values of the one of the tracking signals;

compare, in response to the detection, the one of the tracking signals to the trigger criteria for the plurality of escalation levels, wherein the trigger criteria for each successive escalation level corresponds to an increasing negative trend in the social media conversations;

determine a current escalation level based upon the plurality of escalation levels and the comparison; automatically generate and submit a response to counteract the increasing negative trend according to the current escalation level of the plurality of escalation levels in response to determining that (i) the at least one topic of social media conversation of the one of the tracking signals is within the content category of the current escalation level, and (ii) the predicted future sales impact of the one of the tracking signals is within the sales impact range of the current escalation level;

when the current escalation level is a first escalation level, selecting from the at least one memory device a pre-defined response corresponding to the at least one topic of the one of tracking signals and the first escalation level; and automatically posting the response to an individual poster directly on a social media platform.

* * * * *